United States Patent
Hirabayashi et al.

(10) Patent No.: US 8,622,785 B2
(45) Date of Patent: Jan. 7, 2014

(54) METHOD OF MAKING ANTIREFLECTIVE ROUGHENED SURFACE AND LENS BARREL WITH ROUGHENED SURFACE MADE BY THE METHOD

(75) Inventors: Koichiro Hirabayashi, Osaka (JP); Tetsuya Uno, Osaka (JP); Kazutake Boku, Osaka (JP); Takayuki Kawamura, Osaka (JP)

(73) Assignee: Panasonic Corporation, Osaka (JP)

( * ) Notice: Subject to any disclaimer, the term of this patent is extended or adjusted under 35 U.S.C. 154(b) by 739 days.

(21) Appl. No.: 12/816,418

(22) Filed: Jun. 16, 2010

(65) Prior Publication Data

US 2010/0321783 A1    Dec. 23, 2010

(30) Foreign Application Priority Data

Jun. 18, 2009   (JP) .................. 2009-144895

(51) Int. Cl.
  *B24B 1/00*   (2006.01)
  *B24C 1/00*   (2006.01)
(52) U.S. Cl.
  USPC .............................................. 451/36; 451/39
(58) Field of Classification Search
  USPC ........ 72/53; 451/38, 59, 102, 526, 36, 37, 39; 29/90.7
  See application file for complete search history.

(56) References Cited

U.S. PATENT DOCUMENTS

| | | | | |
|---|---|---|---|---|
| 4,026,007 A * | 5/1977 | Brower | ......................... | 29/527.4 |
| 4,513,597 A * | 4/1985 | Kimoto et al. | ................... | 72/53 |
| 4,753,094 A * | 6/1988 | Spears | ............................. | 72/53 |
| 4,885,213 A * | 12/1989 | Miyamoto et al. | ............. | 428/612 |
| 4,914,796 A * | 4/1990 | Lioy et al. | ...................... | 205/151 |
| 4,925,725 A * | 5/1990 | Endo et al. | ..................... | 428/156 |
| 4,977,656 A * | 12/1990 | Lioy et al. | ...................... | 226/193 |
| 5,057,108 A * | 10/1991 | Shetty et al. | .................... | 606/53 |
| 5,311,652 A * | 5/1994 | McConkey et al. | .......... | 29/81.04 |
| 5,545,268 A * | 8/1996 | Yashiki et al. | .................. | 148/518 |
| 5,549,809 A * | 8/1996 | Barreau et al. | ................. | 205/222 |
| 5,596,912 A * | 1/1997 | Laurence et al. | ............. | 76/107.1 |
| 5,598,730 A * | 2/1997 | Dillon | ................................ | 72/53 |
| 5,704,239 A * | 1/1998 | Beals et al. | ....................... | 72/53 |
| 5,914,825 A * | 6/1999 | Nishio et al. | ................... | 359/851 |
| 6,038,900 A * | 3/2000 | Miyasaka | ......................... | 72/53 |
| 6,352,008 B1 * | 3/2002 | Matsuoka et al. | ............ | 74/433.5 |
| 6,367,151 B1 * | 4/2002 | Schlegel et al. | ............. | 29/888.09 |
| 6,668,611 B2 * | 12/2003 | Kashiwazaki et al. | ........... | 72/269 |
| 7,003,880 B2 * | 2/2006 | Morita | ........................ | 29/890.142 |
| 7,300,622 B2 * | 11/2007 | Lu et al. | ........................ | 266/249 |
| 2003/0012978 A1 * | 1/2003 | Sodani et al. | .................. | 428/659 |
| 2003/0097754 A1 * | 5/2003 | Yamane et al. | .................. | 29/898 |
| 2004/0049285 A1 * | 3/2004 | Haas | .......................... | 623/20.15 |
| 2005/0231807 A1 * | 10/2005 | Suga et al. | ..................... | 359/601 |
| 2007/0254558 A1 * | 11/2007 | Kodera et al. | ................... | 451/28 |

FOREIGN PATENT DOCUMENTS

JP        2-60045 U     5/1990

* cited by examiner

*Primary Examiner* — Teresa M Ekiert
(74) *Attorney, Agent, or Firm* — Renner, Otto, Boisselle & Sklar, LLP

(57) ABSTRACT

A method of turning the surface of a die, which is used to make a product, into an antireflective roughened one includes the steps of: a) producing a first roughness on the surface of the die; and b) producing a second roughness, which is smaller than the first roughness, on the surface of the die on which the first roughness has already been produced.

9 Claims, 5 Drawing Sheets

METHOD OF MAKING ANTIREFLECTIVE ROUGHENED SURFACE AND LENS BARREL WITH ROUGHENED SURFACE MADE BY THE METHOD

BACKGROUND OF THE INVENTION

1. Field of the Invention

The present invention relates to a method of turning the surface of a die, which is used to make a part to put into the lens barrel of a camera, for example, into an antireflective roughened one.

2. Description of the Related Art

A camera such as a still camera or a camcorder receives external light, produces a subject image using an optical system inside its lens barrel, and then projects the subject image onto an image capturing member such as a photosensitive film or an image capture device. In this case, only the subject image that has been produced by the optical system is preferably incident on the image capturing member. Actually, however, there is also other light that has been reflected from inside the lens barrel before impinging on the image capturing member. Such unnecessary reflected light will be superposed as "flare" on the subject image. It is preferred that no flare be produced unless it is used as a sort of special video effect.

To eliminate such flare as much as possible, a part with an antireflective roughened surface is usually arranged inside the lens barrel. As used herein, the "roughened surface" refers to an object surface with a leather pattern, a sand pattern, a sprinkled lacquer pattern, a geometric pattern or any other form of regular or irregular roughness.

Inside the lens barrel, there may be a resin molded part, which often has such a roughened surface. And the surface of a die to make such a part is roughened in advance. Hereinafter, a conventional method for roughening the surface of a die will be described with reference to FIGS. 7 through 9.

FIG. 7 illustrates the shape of an abrasive grain 5 for use in the conventional surface roughening method. The abrasive grain 5 is used in sandblasting and has a size d, which may be approximately 0.01 mm to 2 mm. The abrasive grain 5 is made of aluminum oxide, for example.

FIG. 8 is an enlarged cross-sectional view illustrating the surface of a die 6 and its surrounding portions when blasting is carried out by the conventional surface roughening method.

When abrasive grains 5 are repelled by compressed air, for example, to collide against the surface of the die 6, mountains 6a and valleys 6b are formed.

FIG. 9 is an enlarged cross-sectional view illustrating the surface of a resin molded product 7 that has been molded using the die 6 and its surrounding portions. The valleys 7a of the molded product 7 have been formed by transferring the mountains 6a of the die 6, while the mountains 7b of the molded product 7 have been formed by transferring the valleys 6b of the die 6. And these valleys 7a and mountains 7b form the roughened surface of the molded product 7.

Japanese Utility Model Application Laid-Open Publication No. 2-60045 discloses a technique for forming a finely roughened surface around the periphery of a rearview mirror for cars by making superfine particles collide against the periphery by known blasting process. As a result, it says, in a rearview mirror for cars, unwanted reflection of the light that has come from the periphery and impinged on the mirror surface will be minimized.

According to the conventional method of roughing the surface shown in FIGS. 7 to 9, the abrasive grains 5 easily collide against the mountains 6a of the die 6, thus forming a complex shape on the surface as shown in FIG. 8. On the other hand, the abrasive grains 5 do not collide against the valleys 6b easily and will rarely form a complex shape there. If a resin molding process is carried out using such a die, the mountains 7b of the molded product 7 will reflect the relatively smooth shape of the valleys 6b of the die 6, and therefore, will have a relatively smooth surface, too. In that case, the mountains 7b of the molded product that are located at the uppermost surface thereof will reflect the incoming light easily.

That is why even if the resin molded part inside the barrel is shaped by such a conventional surface roughening method, the incoming light will still be reflected significantly. Thus, when such a resin molded product is used as a part inside the lens barrel, flare will be produced. Also, if a non-reflective surface is required from optical design considerations, the surface of a molded product is sprayed with a special antireflective paint. However, it is expensive and interferes with realizing an inexpensive product to spray the surface with such a special paint.

SUMMARY OF THE INVENTION

It is therefore an object of the present invention to provide a method of making an antireflective roughened surface, which will hardly reflect incoming light at any of various angles of incidence and which will rarely produce flare or any other optical problem.

A method according to the present invention is a method of turning the surface of a die, which is used to make a product, into an antireflective roughened one. The method includes the steps of: a) producing a first roughness on the surface of the die; and b) producing a second roughness which is smaller than the first roughness, on the surface of the die on which the first roughness has already been produced.

In one preferred embodiment, the step a) may include producing the first roughness by performing a first blasting process using abrasive grains of a first size, and the step b) may include producing the second roughness by performing a second blasting process using abrasive grains of a second size that is smaller than the first size.

In another preferred embodiment, the step a) may include producing the first roughness on the surface of the die by performing a first blasting process that roughens an unused smooth die surface to a 10-point average roughness of A μm, and the step b) may include producing the second roughness on the surface of the die, on which the first roughness has already been produced, by performing a second blasting process that roughens an unused smooth die surface to a 10-point average roughness of B μm, where B≤A/2 is satisfied.

In this particular preferred embodiment, A may be in the range of 8 μm to 30 μm and B may be in the range of 2 μm to 6 μm.

In an alternative preferred embodiment, the method may further include the step of producing a third roughness on the surface of the die, on which the second roughness has already been produced, by performing a third blasting process that roughens an unused smooth die surface to a 10-point average roughness of C μm, where C≤B/2 is satisfied.

In a specific preferred embodiment, A≥8 μm.

In still another preferred embodiment, the first size of the abrasive grains may be in the range of 0.4 mm to 1.6 mm, and the second size of the abrasive grains may be equal to or smaller than 0.3 mm.

In yet another preferred embodiment, the abrasive grains of the first and second sizes may have a rugged surface shape.

In yet another preferred embodiment, the abrasive grains of the first and second sizes may include alumina grains.

In yet another preferred embodiment, the step a) may include producing the first roughness by such a process that roughens an unused smooth die surface to a 10-point average roughness of A μm, and the step b) may include producing the second roughness on the surface of the die, on which the first roughness has already been produced, by such a process that roughens an unused smooth die surface to a 10-point average roughness of B μm, where B≤A/2 is satisfied.

In yet another preferred embodiment, the method may further include the step of producing a third roughness on the surface of the die, on which the second roughness has already been produced, by such a process that roughens an unused smooth die surface to a 10-point average roughness of C μm, where C≤B/2 is satisfied.

An antireflective part according to the present invention has been obtained as a resin molded product using the die, the surface of the die having been roughened by a method according to any of the preferred embodiments of the present invention described above.

In one preferred embodiment, the surface of the antireflective part may have both a first roughness and a second roughness, the second roughness being smaller than the first roughness.

A lens barrel according to the present invention includes the antireflective part of the present invention inside.

An image capture device according to the present invention includes the lens barrel of the present invention.

According to the surface roughening method of the present invention, after a first roughness has been produced on the surface of a die, a second roughness, which is smaller than the first roughness, is further produced on the surface of the die on which the first roughness has already been produced. On the surface of the die thus obtained, the second roughness is distributed uniformly inside the first roughness. As a result, the surface of a product to be obtained by transferring such a surface of the die can be an antireflective, uniformly roughened one.

And by arranging such a product inside a lens barrel, for example, the reflection of incoming light can be minimized, and flare or any other optical problem will rarely occur, no matter at what angle the light has been incident. That is why there is no need to spay an expensive antireflective paint anymore.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, a preferred embodiment of a method of making an antireflective roughened surface (which will be simply referred to herein as a "roughened surface") according to the present invention will be described with reference to the accompanying drawings. A preferred embodiment of a lens barrel including a resin molded part that has been made with a die obtained by such a method and a preferred embodiment of an image capture device with such a lens barrel will also be described.

(Embodiment 1)

A First Specific Preferred Embodiment of the present invention to be described below is a method of making a roughened surface by performing different modes of blasting on the same die a number of times compliant with a predetermined standard. As used herein, the "different modes of blasting" means that the blasting is carried out in multiple steps using abrasive grains of different sizes.

For example, when the blasting is carried out for the first time, a first roughness may be produced using abrasive grains of the biggest size. Next, when the blasting is carried out for the second time, a second roughness may be produced on the first roughness using abrasive grains that are smaller in size than the ones used for the first time around. And if the blasting is further carried out for the third time and on, a third roughness will be produced thereon using even smaller abrasive grains than the ones used last time.

On the surface of the die thus obtained, the second roughness is distributed uniformly inside the first roughness. Specifically, the second roughness is also produced on the valleys of the die surface with the first roughness. As a result, on the mountains of the surface of a product to be obtained by using such a die, the second roughness will be distributed uniformly.

Optionally, multiple different degrees of roughness may be produced on the same surface one after another by non-blasting process so that the first roughness that has been produced earlier than any other one is the roughest and the degree of roughness will decrease sequentially after that as will be described later.

The blasting process may be carried out with a known system, and the description thereof will be omitted herein.

Figure 1:
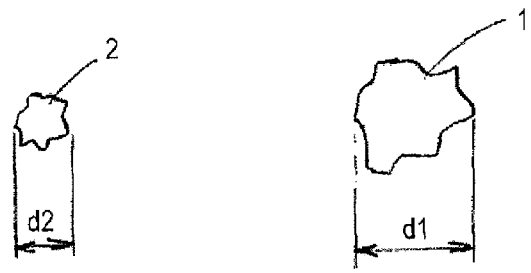
FIG. 1 illustrates abrasive grains 1 and 2 for use to make a roughened surface according to a first preferred embodiment of the present invention.

FIG. 1 illustrates abrasive grains 1 and 2 for use to make a roughened surface according to this preferred embodiment.

The abrasive grain 1 is used to perform the blasting process for the first time (which will be referred to herein as the "first blasting process") and has a size d1 of 0.4 mm to 1.6 mm. Alternatively, the size d1 of the abrasive grain 1 may be an abrasive grain size F22 to F40 according to the JIS (Japanese Industrial Standards) R6001.

On the other hand, the abrasive grain 2 is used to perform the blasting process for the second time (which will be referred to herein as the "second blasting process") and has a size d2 of 0.3 mm or less. Alternatively, the size d2 of the abrasive grain 2 may be an abrasive grain size F100 to F220 according to the JIS R6001 standard.

Both of these abrasive grains 1 and 2 have a rugged surface as can be seen easily from FIG. 1 and may be made of a material including alumina, for example.

Figure 2:
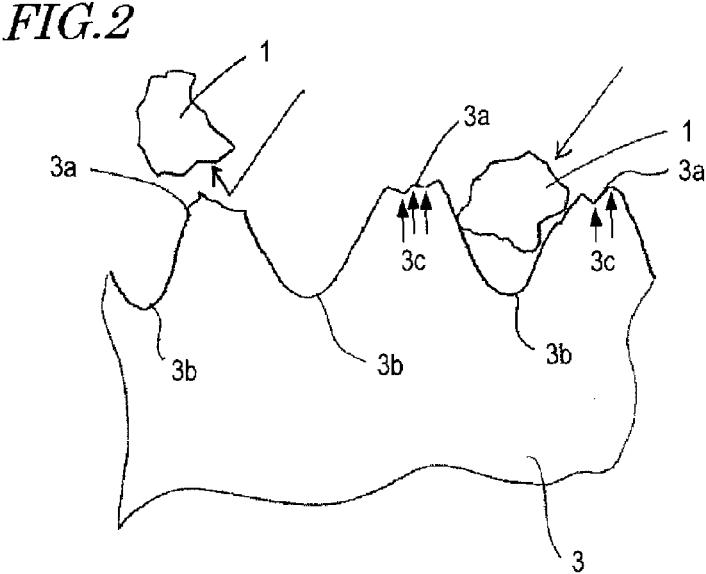
FIG. 2 is an enlarged cross-sectional view of a die on which a first blasting process is being performed according to the first preferred embodiment.

FIG. 2 is an enlarged cross-sectional view of a die on which the first blasting process is being performed according to this preferred embodiment. The die 3 may be used to make a resin molded product, for example.

The abrasive grains 1 are used to perform the first blasting process. In this process, the abrasive grains 1 that have been blasted off collide against the surface of the die 1 that was initially smooth. As a result, mountains 3a and valleys 3b are formed on the surface of the die 3.

If the blasting is performed continuously, more abrasive grains 1 will collide against the mountains 3a one after another, thus producing a fine roughness 3c there. On the other hand, the abrasive grains 1 will not collide against the valleys 3b easily as shown in FIG. 2, and therefore, such fine roughness will not be produced easily on the surface of the valleys 3b. The surface of the die 3 that has been subjected to the first blasting process may have a surface roughness A of 8 µm to 30 µm, which is represented as a 10-point average roughness. Such ruggedness produced by the first blasting process will be referred to herein as a "first roughness" for convenience sake.

Figure 3:
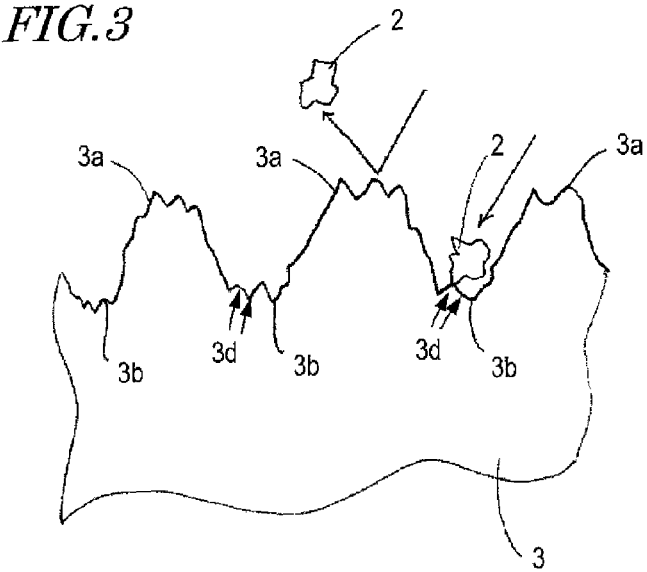
FIG. 3 is an enlarged cross-sectional view of the die 3 on which a second blasting process is being performed according to the first preferred embodiment.

FIG. 3 is an enlarged cross-sectional view of a die on which the second blasting process is being performed according to this preferred embodiment. The die 3 on which the first roughness has been produced through the first blasting process is subjected to the second blasting process using abrasive grains 2. If an unused smooth die surface were subjected to the second blasting process, then the surface roughness B would be 2 µm to 6 µm when represented as a 10-point average roughness. The roughness produced by the second blasting process will be referred to herein as a "second roughness" for convenience sake.

According to this preferred embodiment, the respective sizes d1 and d2 of the abrasive grains 1 and 2, the injection pressures of the abrasive grains 1 and 2, the blasting process time, and other blasting process conditions are set so that the 10-point average roughnesses A and B satisfy the inequality A≥2×B (or B≤A/2). By setting the blasting process conditions as described above for the first and second blasting processes and by performing such blasting in at least two stages, conditions that will not flatten the dents created previously can be obtained. As shown in FIG. 3, the abrasive grains 2 for use to perform the second blasting process can also collide against the valleys 3b of the die 3. As a result, fine roughness 3d is also produced even on the surface of the valleys 3b.

Figure 4:
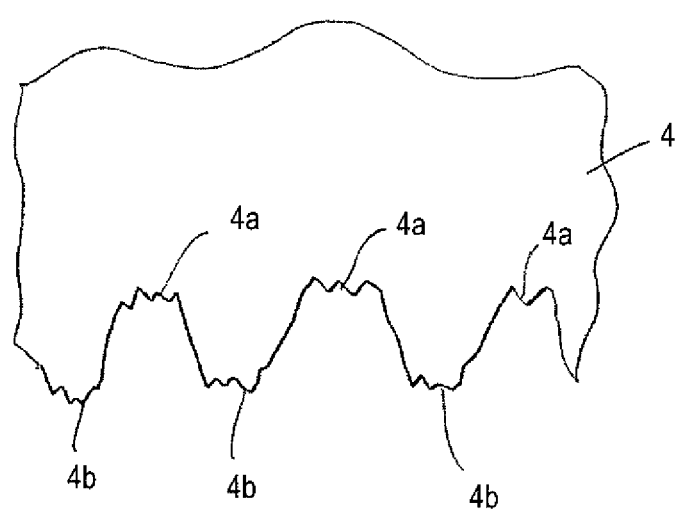
FIG. 4 is a cross-sectional view of a resin molded product that has been obtained using the die 3 on which the second blasting process has been performed.

FIG. 4 is a cross-sectional view of a resin molded product that has been obtained using the die 3 on which the second blasting process has been performed. As shown in FIG. 4, fine roughness has been produced in not only the valleys 4a but also the mountains 4b of the molded product 4. Due to the presence of such roughness, reflection of incoming light from the surface of the molded product 4 can be reduced significantly. And if such a molded product 4 is used as a resin molded part in a lens barrel, for example, the incoming light will be hardly reflected at any of various angles of incidence and flare or any other optical problem can be minimized.

The present inventors discovered, as a result of experiments carried out on various combinations of 10-point average roughnesses, that the condition A≥2×B is most preferably satisfied. We also discovered that A preferably falls within the range of 8 µm to 30 µm, more preferably within the range of 20 µm to 30 µm, in particular, and also discovered that B preferably falls within the range of 2 µm to 6 µm, more preferably within the range of 3 µm to 6 µm, among other things. These preferred values were also obtained as a result of experiments that were carried out on various combinations of 10-point average roughnesses.

The blasting process does not have to be carried out in two stages but may also be performed in three stages. In the latter case, the blasting process is preferably carried out under the following conditions. Specifically, suppose the surface will have a 10-point average roughness of A µm if an unused smooth die surface is subjected to the first blasting process, will have a 10-point average roughness of B µm if an unused smooth die surface is subjected to the second blasting process, and will have a 10-point average roughness of C µm if an unused smooth die surface is subjected to the third blasting process. In that case, the blasting process conditions are preferably set so that B≤A/2 and C≤B/2 are satisfied. More preferably, A≥8 µm is satisfied.

It should be noted that the present invention could be carried out not just by blasting but also by cutting or etching as well. In any case, two, three or more degrees of roughness represented by mutually different 10-point average roughnesses are preferably sequentially produced so that the highest degree of roughness is produced earlier than anything else. For example, if three degrees of roughness need to be produced, the three degrees of roughness are preferably produced sequentially so that their 10-point average roughnesses are A µm, B µm and C µm, respectively, and that B≤A/2 and C≤B/2 are satisfied.

No matter what technique is adopted, according to the surface roughening method of the present invention, a die can be processed using an existent system such as a blasting system with abrasive grains, a cutting machine or an etching system.

(Embodiment 2)

The molded product 4 obtained in the first preferred embodiment (see FIG. 4) may be used as a part to be put into the lens barrel of an image capture device.

Figure 5:
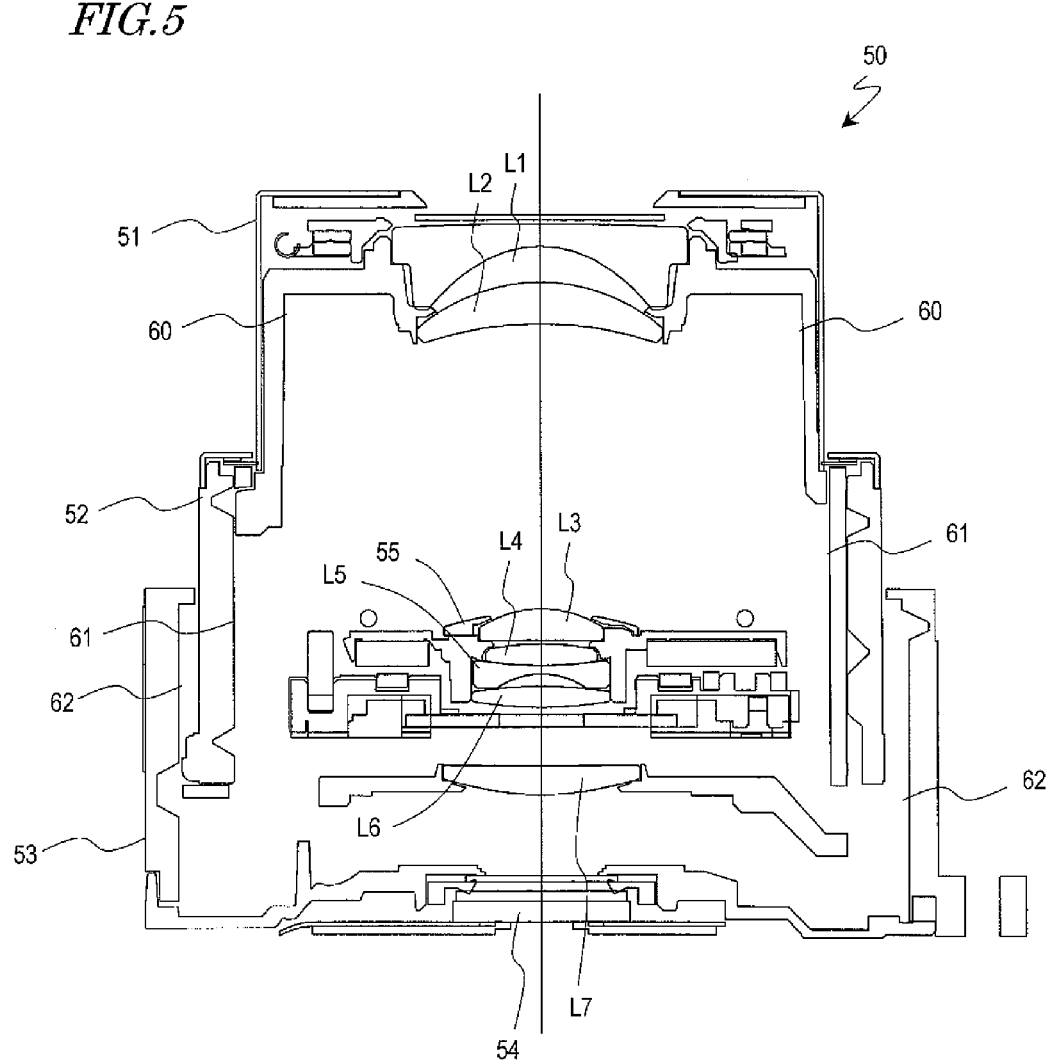
FIG. 5 is a cross-sectional view illustrating a retractable lens barrel 50 as a second specific preferred embodiment of the present invention.

FIG. 5 is a cross-sectional view illustrating a retractable lens barrel 50 as a second specific preferred embodiment of the present invention. The lens barrel 50 includes multiple lenses L1 to L7, multiple lens holders 51 to 53, an imager 54 and a shielding member 55.

Inside those lens holders 51 to 53, arranged are resin molded parts 60 to 62 corresponding to the molded product 4 obtained by the method of the first preferred embodiment. On the inner surface of these resin molded parts 60 to 62, there are valleys 4a and mountains 4b as shown in FIG. 4. Thus, it is possible to prevent unnecessary portions of the externally incoming light that have also entered this lens barrel 50 through the lenses L1 and L2 but will not be guided to the imager 54 from being reflected internally by the lens barrel 50. It should be noted that the lens barrel 50 does not have to have such a retractable structure and could have its length fixed in the optical axis direction.

The shielding member 55 is also provided to shut out unnecessary light. That is why just like the resin molded parts 60 to 62, the die to make this shielding member 55 may also be processed by the method of the first preferred embodiment described above. Then, it is possible to prevent unnecessary light from being reflected from the surface of the shielding member 55.

Figure 6:
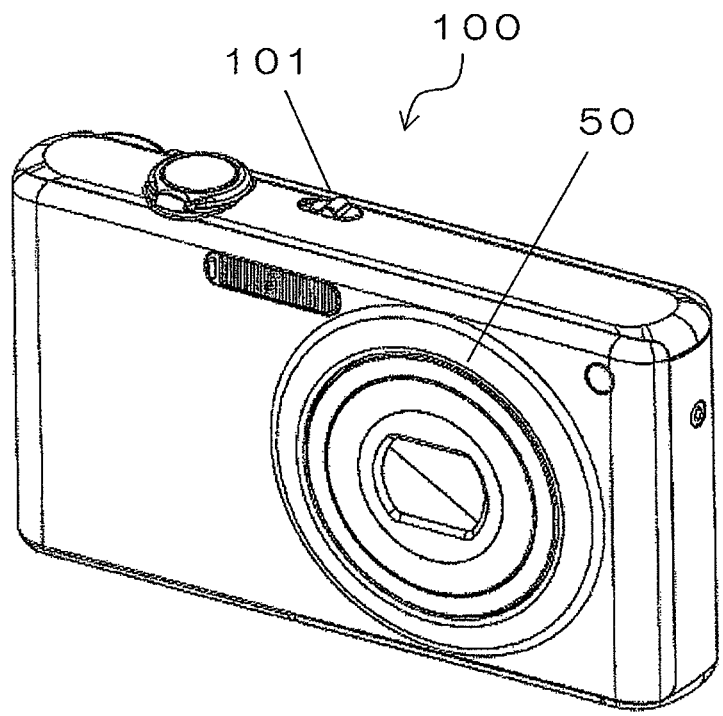
FIG. 6 illustrates the appearance of a digital camera 100 with the lens barrel 50 shown in FIG. 5.
Figure 7:
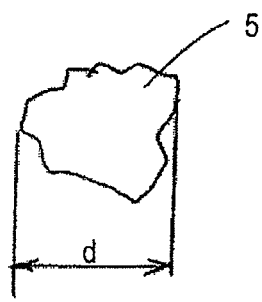
FIG. 7 illustrates the shape of an abrasive grain 5 for use in the conventional surface roughening method.
Figure 8:
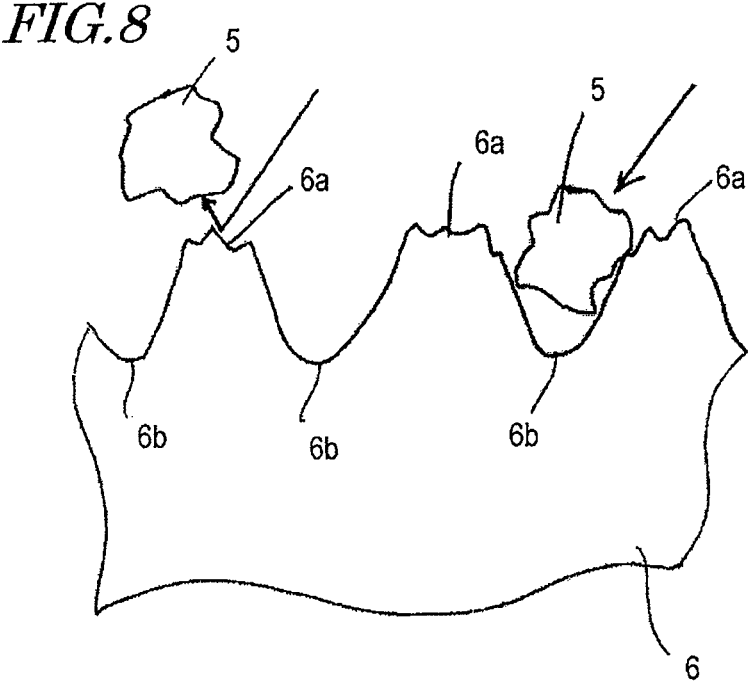
FIG. 8 is an enlarged cross-sectional view illustrating the surface of a die 6 and its surrounding portions when blasting is carried out by the conventional surface roughening method.
Figure 9:
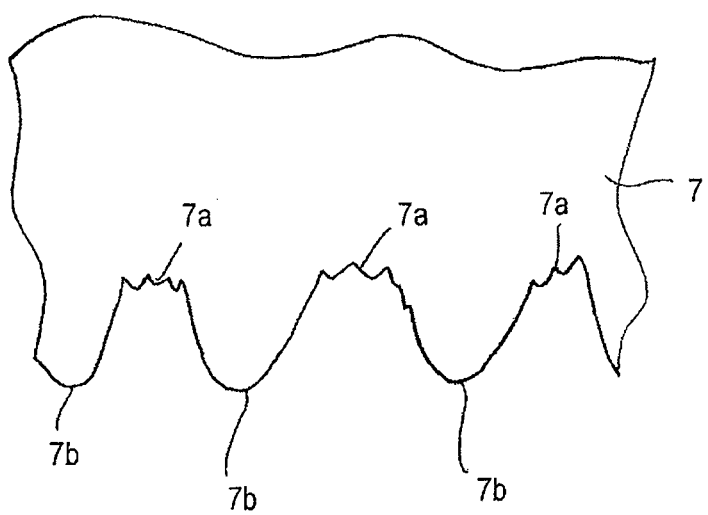
FIG. 9 is an enlarged cross-sectional view illustrating the surface of a resin molded product 7 that has been molded using the die 6 and its surrounding portions.

FIG. 6 illustrates the appearance of a digital camera 100 with the lens barrel 50 shown in FIG. 5. When this camera 100 is turned ON with a power switch 101, the lens barrel 50 protrudes from the digital camera 100 as shown in FIG. 5, thus making this camera 100 ready to shoot.

It should be noted that the digital camera 100 with the lens barrel 50 shown in FIG. 6 is just an example of the present invention. Rather the present invention is applicable to not only digital cameras but also analog film cameras and cameras, of which the lens barrel 50 is removable and replaceable. Furthermore, the present invention is applicable to even camcorders that can shoot a moving picture, not just still cameras.

Preferred embodiments of the present invention have been described but the present invention is in no way limited to those illustrative preferred embodiments but could be modified in numerous ways.

For example, although a method of preparing a die for a resin molding process has been described as a preferred embodiment of the present invention, the present invention is also applicable to preparing a die for use to form a metallic material, not just a resin, into a desired shape.

According to the surface roughening method of the present invention, by subjecting a die to make a molded product to a surface roughening process, a roughened surface, which will hardly reflect any incoming light, no matter at what angle the light has been incident, and which will rarely produce flare or any other optical problem even when applied to a resin molded part to put into a lens barrel, is realized without using any expensive antireflective paint.

According to the surface roughening method of the present invention, a die to make a resin molded part or a shielding member to be used inside a lens barrel can be prepared. And an antireflective resin molded product and other products can be obtained by using such a die. A molded product thus obtained is used inside a lens barrel. And an image capture device can also be fabricated using such a lens barrel.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2009-144895 filed on Jun. 18, 2009 and No. 2010-135843 filed on Jun. 15, 2010, the entire contents of which are hereby incorporated by reference.

What is claimed is:

1. A method of turning a surface of a die, which is used to make a product, into an antireflective roughened surface, the method comprising the steps of:
   a) producing a first roughness on the surface of the die; and
   b) producing a second roughness, which is smaller than the first roughness, on the surface of the die on which the first roughness has already been produced wherein the step a) includes producing the first roughness by performing a first blasting process using abrasive grains of a first size,
   wherein the step b) includes producing the second roughness by performing a second blasting process using abrasive grains of a second size that is smaller than the first size, and
   wherein the abrasive grains of the first and second sizes have a rugged surface shape.

2. The method of claim 1, wherein the step a) includes producing the first roughness on the surface of the die by performing a first blasting process that roughens an unused smooth die surface to a 10-point average roughness of A μm, and
   wherein the step b) includes producing the second roughness on the surface of the die, on which the first roughness has already been produced, by performing a second blasting process that roughens an unused smooth die surface to a 10-point average roughness of B μm, where $B \leq A/2$ is satisfied.

3. The method of claim 2, wherein A is in the range of 8 μm to 30 μm and B is in the range of 2 μm to 6 μm.

4. The method of claim 2, further comprising the step of producing a third roughness on the surface of the die, on which the second roughness has already been produced, by performing a third blasting process that roughens an unused smooth die surface to a 10-point average roughness of C μm, where $C \leq B/2$ is satisfied.

5. The method of claim 4, wherein $A \geq 8$ μm.

6. The method of claim 1, wherein the first size of the abrasive grains is in the range of 0.4 mm to 1.6 mm, and
   wherein the second size of the abrasive grains is equal to or smaller than 0.3 mm.

7. The method of claim 1, wherein the abrasive grains of the first and second sizes include alumina grains.

8. The method of claim 1, wherein the step a) includes producing the first roughness by such a process that roughens an unused smooth die surface to a 10-point average roughness of A μm, and
   wherein the step b) includes producing the second roughness on the surface of the die, on which the first roughness has already been produced, by such a process that roughens an unused smooth die surface to a 10-point average roughness of B μm, where $B \leq A/2$ is satisfied.

9. The method of claim 8, further comprising the step of producing a third roughness on the surface of the die, on which the second roughness has already been produced, by such a process that roughens an unused smooth die surface to a 10-point average roughness of C μm, where $C \leq B/2$ is satisfied.

* * * * *